US006606430B2

United States Patent
Bartur et al.

(10) Patent No.: US 6,606,430 B2
(45) Date of Patent: Aug. 12, 2003

(54) PASSIVE OPTICAL NETWORK WITH ANALOG DISTRIBUTION

(75) Inventors: Meir Bartur, Los Angeles, CA (US); Farzad Ghadooshahy, Brentwood, CA (US); Sean Zargari, Woodland Hills, CA (US); Jim Stephenson, Thousand Oaks, CA (US); Alfred Makonnen, Santa Monica, CA (US); Kerry Quinn, Erie, CO (US)

(73) Assignee: Optical Zonu Corporation, Van Nuys, CA (US)

( * ) Notice: Subject to any disclaimer, the term of this patent is extended or adjusted under 35 U.S.C. 154(b) by 97 days.

(21) Appl. No.: 09/946,740

(22) Filed: Sep. 4, 2001

(65) Prior Publication Data

US 2002/0061163 A1 May 23, 2002

Related U.S. Application Data

(63) Continuation-in-part of application No. 09/836,500, filed on Apr. 17, 2001, which is a continuation-in-part of application No. 09/907,056, filed on Jul. 17, 2001, which is a continuation-in-part of application No. 09/907,057, filed on Jul. 17, 2001, which is a continuation-in-part of application No. 09/907,137, filed on Jul. 17, 2001, which is a continuation-in-part of application No. 09/907,232, filed on Jul. 17, 2001

(60) Provisional application No. 60/241,117, filed on Oct. 17, 2000, provisional application No. 60/230,130, filed on Sep. 5, 2000, provisional application No. 60/230,131, filed on Sep. 5, 2000, provisional application No. 60/230,132, filed on Sep. 5, 2000, provisional application No. 60/230,133, filed on Sep. 5, 2000, provisional application No. 60/230,134, filed on Sep. 5, 2000, provisional application No. 60/230,571, filed on Sep. 5, 2000, and provisional application No. 60/230,572, filed on Sep. 5, 2000.

(51) Int. Cl.[7] .............................. G02B 6/28; H04B 10/24

(52) U.S. Cl. .................. 385/24; 359/114; 359/125; 359/173

(58) Field of Search .................. 385/24, 37; 359/124, 359/125, 130, 173, 154; 455/6.1, 5.1, 73; 348/12.6

(56) References Cited

U.S. PATENT DOCUMENTS

| 5,969,836 A | * | 10/1999 | Foltzer ..................... 359/114 |
| 6,490,727 B1 | * | 12/2002 | Nazarathy et al. .......... 725/129 |
| 2003/0030871 A1 | * | 2/2003 | Dove ........................ 359/173 |

OTHER PUBLICATIONS

"Passive Optical Networks (PON) for the Broadband Local Loop", Gerry Pesavento and Mark Kelsey, Alloptic, Inc., Jul. 1999, pp. 1–7.

* cited by examiner

Primary Examiner—Hemang Sanghavi
(74) Attorney, Agent, or Firm—Myers Dawes Andras & Sherman

(57) ABSTRACT

A passive optical network which is capable of full duplex digital transmission at high data rates and which also provides analog broadcast transmission is disclosed. A central station provides analog broadcast transmission at a first wavelength of light and full duplex digital transmission using second and third wavelengths of light. Optical networking units, electrically or wirelessly coupled to end users in the network, are optically coupled to the central station via passive optical network nodes. The optical networking units resolve the two broadcast streams from the central station employing compact optics configured on a transparent substrate and provide burst mode digital transmission up stream to the central station on a time division multiple access basis.

20 Claims, 2 Drawing Sheets

PASSIVE OPTICAL NETWORK WITH ANALOG DISTRIBUTION

RELATED APPLICATION INFORMATION

This is a Continuation-in-part (CIP) of prior application Nos.: 09/836,500 filed Apr. 17, 2001; 09/907,056 filed Jul. 17, 2001; 09/907,057 filed Jul. 17, 2001; 09/907,307 filed Jul. 17, 2001; 09/907,232 filed Jul. 17, 2001.

The present application claims priority under 35 USC 119 (e) of provisional application serial No. 60/241,117 filed Oct. 17, 2000 the disclosure of which is incorporated herein by reference. The present application further claims priority under 35 USC 119 (e) of provisional applications serial Nos. 60/230,130, 60/230,131, 60/230,132, 60/230,133, 60/230,134, 60/230,571 and 60/230,572 all filed Sep. 5, 2000 the disclosures of which are incorporated herein by reference. The present application further claims the benefit under 35 USC 120 of the prior filed nonprovisional application Ser. No. 09/836,500 filed Apr. 17, 2001 and Ser. Nos. 09/907,056, 09/907,057, 09/907,137, and 09/907,232, filed Jul. 17, 2001, the disclosures of which are incorporated herein by reference.

BACKGROUND OF THE INVENTION

1. Field of the Invention

The present invention relates to fiber optic networks and methods of transmitting and receiving data along fiber optic networks.

2. Background of the Prior Art and Related Information

Fiber optic distribution networks are becoming increasingly important for the provision of high bandwidth data links to commercial and residential locations. Such systems employ optical data transmitters and receivers (or "transceivers") throughout the fiber optic distribution network. Such transceivers convert electrical signals to optical signals for optical transmission over optical fibers and receive optical signals from the fibers and convert the modulated light to electrical signals. In an Active Optical Network (AON) such transceivers are employed to provide optical-to-electrical-to-optical conversion at each node in the network. To enable high bandwidth data transmission, these transceivers must incorporate high speed electrical circuits along with active and passive optical components, which results in each transceiver being a relatively high cost component. The need for large numbers of transceivers in an AON fiber optic network thus adds considerable cost to the fiber optic network.

The Passive Optical Network (PON) architecture was designed to eliminate the need for optical to electrical conversion, and hence transceivers, at each node of the fiber optic network. The PON architecture employs passive optical components such as beam splitters and filters at the network nodes instead of active optical components. The PON architecture thus has significant cost benefits relative to AON fiber optic networks. The PON architecture was also designed for two way, point to multipoint data communication. Therefore, the PON architecture has significant potential for "last mile" applications where both two way data transfer and point to multipoint broadcast to end users are desired. Nonetheless, the full potential of PON optical fiber networks has not been achieved in such applications due to problems in providing an effective combination of point to multipoint full duplex digital transmission at high data rates and analog broadcast transmission. Combining these involves both continuous and burst mode transmitters and receivers, precise optical packaging, and effective analog and digital signal separation and amplification.

More specifically, a typical data burst or packet comprises a relatively short, high density burst of data. Each burst is typically followed by a relatively long period during which the transmitter is asleep, before the next data burst. During this sleep period another transmitter may be active on the same fiber. Such burst transmission may thus allow multiple transceivers to share an optical fiber on a time division multiple access (TDMA) basis. Also, such burst transmission may allow one receiver to be coupled to receive data from many transmitters on a time multiplexed basis, whether by sharing of a fiber or with separate fibers. Burst transmission is employed in PON fiber optic data distribution networks which couple a central data distribution transceiver to multiple end user transceivers on a TDMA basis. Also, continuous and burst transmission need to be combined in a PON fiber optic data distribution network providing broadcast transmission. For example, a central data distribution transceiver would transmit in a continuous mode, whereas the end user transceivers transmit in a burst mode back to the central data distribution transceiver. Both burst mode transmission and continuous mode transmission can create difficult constraints on transmitter performance, especially at high data rates. Providing full duplex transmission also requires Wavelength Division Multiplexing (WDM) with two wavelengths of light. Adding broadcast analog, such as Cable TV (CATV), would require a third wavelength of light. WDM in turn requires that the different wavelengths of light can be accurately separated as needed at the network nodes. The difficulty increases with the number of separate wavelengths being discriminated. Large networks with many nodes require precise, compact and cost effective configurations of such optical components. These constraints are difficult to meet simultaneously. Finally, signal to noise problems are exacerbated in analog broadcast and recovery over PON networks. A PON split of 32 adds about 17 dB loss of optical signal. User distance ranges from the central station of the order of 20 km will add an additional 8 dB loss. This can result in problems meeting minimum signal to noise (S/N) ratios with conventional signal separation and amplification circuitry.

From the above it will be appreciated that providing a combination of high data rate full duplex and point to multipoint broadcast transmission, and analog broadcast capability, in a PON architecture presents extremely difficult problems. Also, it is extremely important to provide solutions to these problems without significantly increasing the costs of the system.

SUMMARY OF THE INVENTION

The present invention provides a passive optical network (PON) which superimposes distribution of analog signals (AM modulation) like CATV and DBS signals over PON architecture.

In a first aspect the present invention provides a passive optical network, comprising a central station including a first optical transceiver for transmitting analog and digital signals along an optical fiber at first and second wavelengths of light, respectively, and for receiving digital optical signals in burst mode from said fiber at a third wavelength of light. The passive optical network further comprises an optical networking unit coupled to an optical fiber of the network, the optical networking unit including a second optical transceiver for transmitting digital optical signals to said central station in burst mode at the third wavelength of light and optical means for resolving the analog and digital signals from the central station, said optical means comprising optical components mounted via a radiation curable adhesive on a substrate at least a portion of which is transparent to the radiation. The passive optical network further comprises a passive optical network node, coupled to plural optical fibers of the network and configured between said central station and said optical networking unit, for directing said wavelengths of light between said central station and said optical networking unit.

In a preferred embodiment of the passive optical network, the first wavelength of light is about 1520–1600 nm. and the second wavelength of light is about 1440–1500 nm. Alternatively, the first wavelength of light may be about 1580 nm. and the second wavelength of light about 1480–1550 nm. The third wavelength of light may be about 1280–1380 nm. The analog signal preferably comprises an amplitude modulated RF signal. For example, the analog signal may comprise a cable TV signal. The analog signal may also comprise a DBS signal. The digital signals in turn may comprise data packets. For example, the digital signals may comprise internet data.

Accordingly, it will be appreciated that the present invention provides a passive optical network which is capable of point to multipoint full duplex digital transmission at high data rates and which also provides analog broadcast transmission. Further aspects of the present invention, and further features and advantages of the present invention, will be appreciated from a review of the following detailed description of the invention.

DETAILED DESCRIPTION OF THE INVENTION

Figure 1:
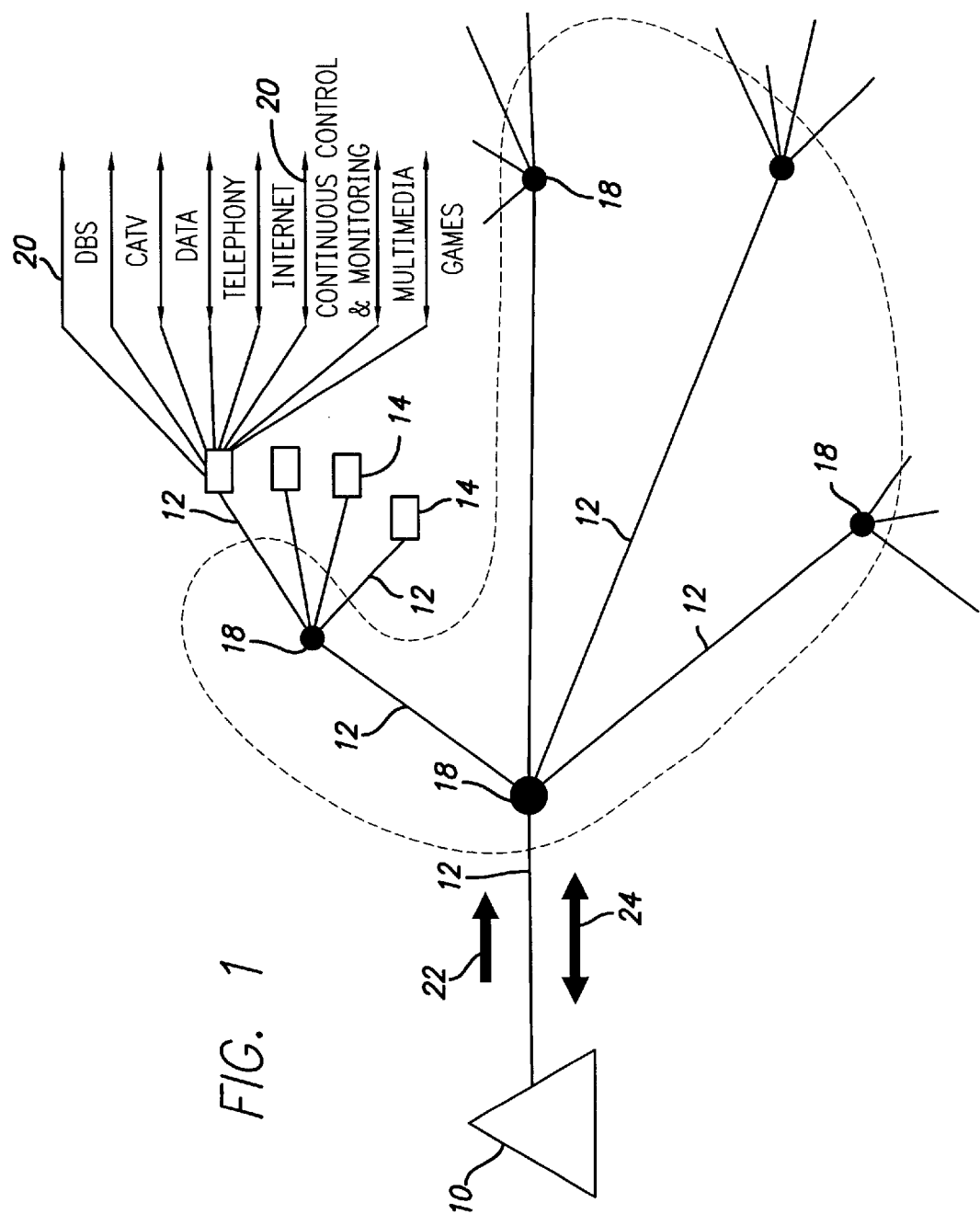
FIG. 1 is a schematic drawing of a passive optical network in accordance with the present invention.

Referring to FIG. 1 a PON in accordance with the present invention is illustrated. The illustrated architecture is a tree configuration suitable for a "last mile" implementation but due to the complexity of network architectures employed in real world settings it should be appreciated that the specific architecture is purely illustrative in nature.

As illustrated, the PON couples a central station 10 to a plurality of Optical Networking Units (ONUs) 14 via PON nodes 18. The PON node distribution area is illustrated schematically by the dashed line. The links 12 are optical fiber light based transmission links while the links 20 are electrical or wireless transmission links. The central station need not be the absolute center of the overall network, e.g., a cable or telecom network, and as used herein the term "central station" simply means a location in the network where point to multipoint transmission is provided via PON nodes. The central station includes an appropriate transceiver for providing the broadcast optical signals, which transceiver is referred to as an OLT (Optical Light Termination or Optical Line Terminal). As indicated by the single and dual direction arrows, 22, 24, respectively, the PON enables both point to multipoint broadcast and bi-directional (duplex) transmission between the central station and ONUs. For example, the broadcast signals may include CATV, DBS and data while the bi-directional signals may include telephone, internet, video, multimedia, games and continuous monitoring and control. The ONUs convert the optical signals provided along the optical fibers to electrical or wireless signals which are provided along links 20 to the end user. The ONUs also convert the end user electrical signals to optical signals for upstream transmission to the central station for bi-directional communication. The ONUs may be configured in the home, office or a local end-user distribution location such as a cabinet, building or curb location.

The illustrated PON preferably uses two wavelengths of light for full duplex TDMA data communication. In particular, the ITU G983.1 specification may be employed, the disclosure of which is incorporated herein by reference. The down stream (from central station to user) is 1440–1600 nm and the up-stream (back to central station from user) is 1280–1380 nm.

The PON of FIG. 1 injects analog signals at central station 10 into the down stream (broadcast to ONUs) along with the data signals. The analog signal may be an RF amplitude modulated signal including CATV in the 50–860 MHz band and/or DBS in the 950–2050 MHz band. The analog signal can be at the 1520–1600 nm range of wavelength of light (e.g., 1550 nm) with the data signal at the 1440–1500 nm range (e.g., 1480 nm). Alternatively, the analog signal can be at about 1580 nm wavelength of light and the data signal at the 1480 nm to 1550 nm range. These two broadcast optical signals are resolved by the ONUs, as described below in relation to FIG. 3.

Figure 2:
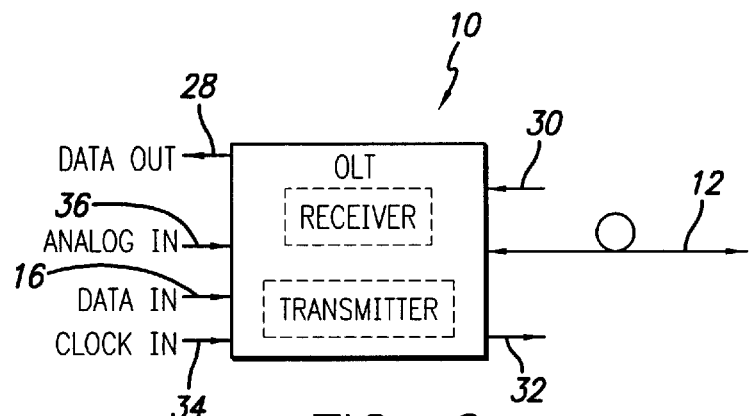
FIG. 2 is a block schematic drawing of a central station transceiver in accordance with the present invention.

Referring to FIG. 2, a central station OLT transceiver 10 is illustrated. OLT transceiver 10 is coupled to optical fiber 12. As indicated by the arrows on the optical fibers, transceiver 10 transmits data in the form of modulated optical light signals along optical fiber 12. The data to be transmitted may be provided to transceiver 10 from an external data source in the form of input electrical data signals along line 16. OLT transceiver 10 also receives a clock signal along line 34. OLT transceiver 10 also receives an analog signal such as described above along line 36. The transmitter portion of OLT transceiver 10 operates in a continuous mode to optically transmit both the digital and analog signals along fiber 12 at two different wavelengths of light within a downstream band of wavelengths, as discussed above. Transceiver 10 also receives as an input modulated light signals at a third wavelength along fiber 12 comprising data burst transmitted on a TDMA basis from plural ONUs. Transceiver 10 converts the received modulated light signals to electrical signals and provides output data signals along line 28, as illustrated. Transceiver 10 thus includes receiver circuitry to convert optical signals, provided in burst mode along the optical fibers from plural ONUs, to electrical signals and to detect encoded data. The OLT may employ the transceiver design disclosed in provisional application serial No. 60/230,133 filed Sep. 5, 2000 entitled Continuous or Burst-Mode Digital Fiber Optic Transceiver With Dual or Single Fiber and Front End Level Control and in nonprovisional application Ser. No. 09/907,137 entitled Fiber Optic Transceiver Employing Front End Level Control, filed Jul. 17, 2001. The OLT may also employ the transceiver design disclosed in provisional application serial No. 60/230,571 filed Sep. 5, 2000 entitled Continuous or Burst-Mode Digital Fiber Optic Transceiver With Dual Or Single Fiber and Clock/Data Phase Aligner and in nonprovisional application Ser. No. 09/907,057 entitled Fiber Optic Transceiver Employing Clock and Data Phase Aligner filed Jul. 17, 2001. The disclosures of each of these provisional and nonprovisional applications are incorporated herein by reference. It will further be appreciated that additional fiber coupling may also be provided for various applications and architectures and such are illustrated by fibers 30 and 32. For example, separate fibers may be provided for down stream and up stream transmission as indicted schematically by the arrows on fibers 30 and 32, and such an alternate dual fiber system is also within the PON of the present invention.

Figure 3:
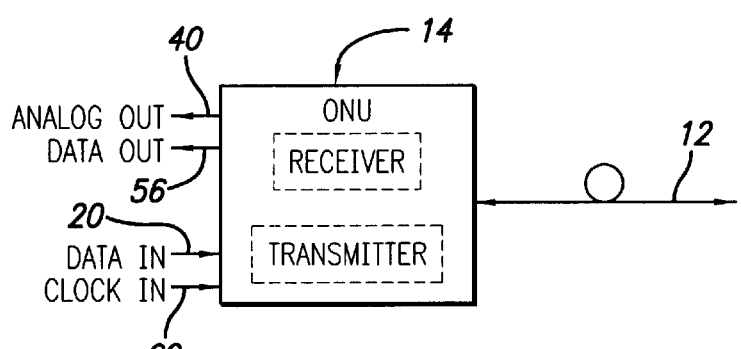
FIG. 3 is a block schematic drawing of an optical networking unit transceiver in accordance with the present invention.

Referring to FIG. 3, an ONU transceiver 14 is illustrated. End user input electrical data signals are provided along line 20 to transceiver 14 for upstream burst mode transmission as modulated light signals along fiber 12 to OLT transceiver 10. Transceiver 14 also receives modulated light pulses from the central station along fiber 12, converts them to electrical signals and derives analog and data signals which are output along lines 40 and 56, respectively. Also, a clock input along line 62 is provided for use in data recovery which clock matches the frequency of central station clock 34. The receiver may alternatively derive the clock signal from the digital signal if a clock signal is not available locally. In the latter case the receiver includes a clock and data recovery circuit which generates a clock signal from the transitions in the digital signal, for example, using a phase locked loop (PLL).

For the digital receiver and digital upstream burst mode transmitter the ONU transceiver 14 may employ the transceiver design shown in provisional application serial No. 60/230,134 filed Sep. 5, 2000 entitled Continuous or Burst-Mode Digital Fiber Optic Transceiver With Dual Or Single Fiber and Analog Dual Loop Compensation and nonprovisional application Ser. No. 09/907,232 entitled Fiber Optic Transceiver Employing Analog Dual Loop Compensation, filed Jul. 17, 2001. Alternatively, the ONU may employ the transceiver design shown in provisional application serial No. 60/230,130 filed Sep. 5, 2000 entitled Continuous or Burst-Mode Digital Fiber Optic Transceiver With Dual Or Single Fiber and Digital Dual Loop Compensation and nonprovisional application Ser. No. 09/907,056 entitled Fiber Optic Transceiver Employing Digital Dual Loop Compensation, filed Jul. 17, 2001. The ONU may also employ the transceiver design disclosed in provisional application serial No. 60/230,133 filed Sep. 5, 2000 entitled Continuous or Burst-Mode Digital Fiber Optic Transceiver With Dual or Single Fiber and Front End Level Control and in nonprovisional application Ser. No. 09/907,137 entitled Fiber Optic Transceiver Employing Front End Level Control, filed Jul. 17, 2001. The ONU may also employ the transceiver design disclosed in provisional application serial No. 60/230,571 filed Sep. 5, 2000 entitled Continuous or Burst-Mode Digital Fiber Optic Transceiver With Dual Or Single Fiber and Clock/Data Phase Aligner and in nonprovisional application Ser. No. 09/907,057 entitled Fiber Optic Transceiver Employing Clock and Data Phase Aligner filed Jul. 17, 2001. The disclosures of each of these provisional and nonprovisional applications are incorporated herein by reference.

As noted above, in addition to receiving digital signals the ONU transceiver 14 also receives analog signals provided along fiber 12 and provides an analog electrical output along line 40. ONU 14 employs optical means for resolving the two down-loading streams, at the first and second wavelengths, employing optics described in provisional application serial No. 60/230,132 filed Sep. 5, 2000 entitled Optical Packaging and nonprovisional application Ser. No. 09/836,500 filed Apr. 17, 2001 entitled Optical Networking Unit Employing Optimized Optical Packaging the disclosures of which are incorporated herein by reference. As described therein the optical components, are mounted on a substrate which is transparent to radiation; i.e., the substrate allows a desired wavelength of radiation to pass through all or a portion of the substrate. This allows the use of a radiation curable adhesive, such as a UV curable adhesive such as Optocast 3400 epoxy and 325 nm. radiation, to secure the optical components to the substrate. The substrate may be composed of a transparent material or a material with holes therethrough which allow the radiation through the substrate in regions where adhesive bonding is desired. This allows a precise and cost effective optical assembly. A suitable configuration of optical components is shown schematically in FIGS. 9 and 10 of the above noted nonprovisional application Ser. No. 09/836,500 and their configuration on the substrate is illustrated in FIG. 6. Passive optical components include first and second beam splitters and first and second filters. These passive optical components resolve the two down stream optical signals, i.e., the analog and digital optical signals from the central station. Active optical components include a laser diode for up stream burst transmission and first and second photodetectors for detecting the analog and digital down stream optical signals. One or more of the active optical components may comprise another known active optical component in the same package mounted on the substrate. In particular, a photodetector and built-in amplifier combination, such as a combined photodetector and cable TV amplifier or PIN—TIA combination, or other known active optical component, may be provided.

The received analog signal must have an adequate signal to noise ratio for the application, e.g., CATV to the home. A PON split of 32 adds about 17 dB loss of optical signal. User distance ranges from the central station of the order of 20 km will add an additional 8 dB loss. By using a strong signal at the central station (on the order of 10–17 dBm) an ONU receiver (described in provisional application serial No. 60/230,131 filed Sep. 5, 2000 entitled Integrated Dual Band, Dual Output Front End Receiver, the disclosure of which is incorporated herein by reference) with sensitivity at about −10 dBm will provide the necessary S/N to enable 10 dBmV signal as required at the user premises. The ONU receiver may also employ a receiver design as shown in provisional application No. 60/230,572 filed Sep. 5, 2000 entitled Integrated Push-Pull Front End Receiver With Dual Band Output, the disclosure of which is incorporated herein by reference. Either of such receivers may be combined in a single package with the photodetector receiving the optical analog signal and mounted on the optical assembly substrate as noted above.

Figure 4:
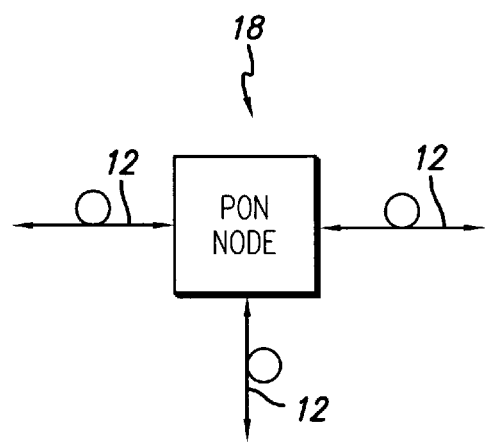
FIG. 4 is a block schematic drawing of a PON node in accordance with the present invention.

Referring to FIG. 4, a block schematic drawing of a PON node is illustrated. The PON node 18 employs passive optical components, such as beam splitters and filters, so as to selectively pass optical signals between optical fibers 12. The PON node 18 may employ passive optical components and packaging described in provisional application serial No. 60/230,132 filed Sep. 5, 2000 entitled Optical Packaging and nonprovisional application Ser. No. 09/836,500 filed Apr. 17, 2001 entitled Optical Networking Unit Employing Optimized Optical Packaging, the disclosures of which are incorporated herein by reference.

Although the present invention has been described in relation to specific embodiments it should be appreciated that the present invention is not limited to these specific embodiments as a number of variations are possible while remaining within the scope of the present invention. In particular, the specific network implementations illustrated are purely exemplary and may be varied in ways too numerous, to enumerate in detail. Accordingly they should not be viewed as limiting in nature.

What is claimed is:

1. A fiber optic network, comprising:

a central station including a first optical transceiver for transmitting analog and digital signals along an optical fiber at first and second wavelengths of light, respectively, and for receiving digital optical signals in burst mode from said fiber at a third wavelength of light;

an optical networking unit coupled to an optical fiber including a second optical transceiver for transmitting digital optical signals to said central station in burst mode at said third wavelength of light and optical means for resolving the analog and digital signals from the central station, said optical means comprising optical components mounted via a radiation curable adhesive on a substrate at least a portion of which is transparent to the radiation; and a passive optical network node, coupled to plural optical fibers and configured between said central station and said optical networking unit, for directing said wavelengths of light between said central station and said optical networking unit.

2. A fiber optic network as set out in claim 1, wherein said first wavelength of light is about 1520–1600 nm.

3. A fiber optic network as set out in claim 2, wherein said second wavelength of light is about 1440–1500 nm.

4. A fiber optic network as set out in claim 2, wherein said third wavelength of light is about 1280–1380 nm.

5. A fiber optic network as set out in claim 1, wherein said first wavelength of light is about 1580 nm.

6. A fiber optic network as set out in claim 5, wherein said second wavelength of light is about 1480–1550 nm.

7. A fiber optic network as set out in claim 5, wherein said third wavelength of light is about 1280–1380 nm.

8. A fiber optic network as set out in claim 1, wherein said analog signal comprises an amplitude modulated RF signal.

9. A fiber optic network as set out in claim 8, wherein said analog signal comprises a cable TV signal.

10. A fiber optic network as set out in claim 8, wherein said analog signal comprises a DBS signal.

11. A fiber optic network as set out in claim 1, wherein said digital signals comprise data packets.

12. A fiber optic network as set out in claim 11, wherein said digital signals comprise internet data.

13. A fiber optic network, comprising:

a central station including first optical transceiver means for transmitting analog and digital signals along an optical fiber at first and second wavelengths of light, respectively, and for receiving digital optical signals in burst mode from said fiber at a third wavelength of light;

a first optical networking unit coupled to an optical fiber including second optical transceiver means for transmitting digital optical signals to said central station in burst mode and first optical means for resolving the analog and digital signals from the central station, said optical means comprising optical components mounted via a radiation curable adhesive on a substrate at least a portion of which is transparent to the radiation;

a second optical networking unit coupled to an optical fiber including third optical transceiver means for transmitting digital optical signals to said central station in burst mode at said third wavelength of light and second optical means for resolving the analog and digital signals from the central station, said optical means comprising optical components mounted via a radiation curable adhesive on a substrate at least a portion of which is transparent to the radiation;

wherein said first and second optical networking units burst transmit said digital optical signals at said third wavelength of light on a time division multiple access basis; and a passive optical network node, coupled to plural optical fibers and configured between said central station and said first and second optical networking units, for directing said wavelengths of light between said central station and said optical networking units.

14. A fiber optic network as set out in claim 13, wherein said first wavelength of light is about 1520–1600 nm.

15. A fiber optic network as set out in claim 14, wherein said second wavelength of light is about 1440–1500 nm.

16. A fiber optic network as set out in claim 14, wherein said third wavelength of light is about 1280–1380 nm.

17. A fiber optic network as set out in claim 13, wherein said first wavelength of light is about 1580 nm.

18. A fiber optic network as set out in claim 17, wherein said second wavelength of light is about 1480–1550 nm.

19. A fiber optic network as set out in claim 17, wherein said third wavelength of light is about 1280–1380 nm.

20. A fiber optic network as set out in claim 13, wherein said analog signal comprises an amplitude modulated RF signal.

* * * * *